April 13, 1965 A. G. H. VANDERPOEL 3,177,858
ANTI-FOULING OF BLOWBY RETURN SYSTEMS
Filed Feb. 28, 1964
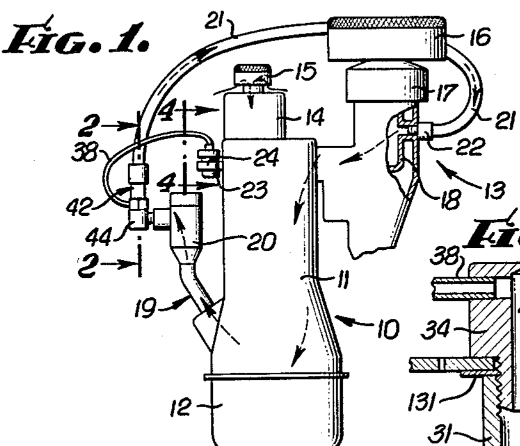
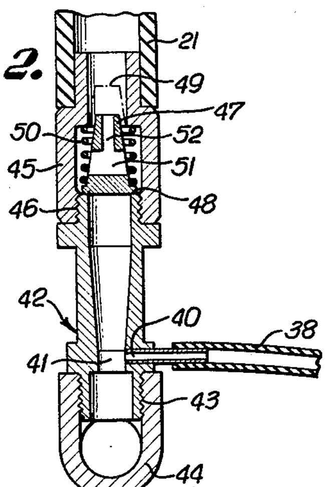
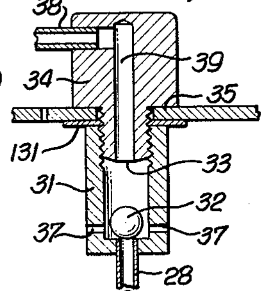
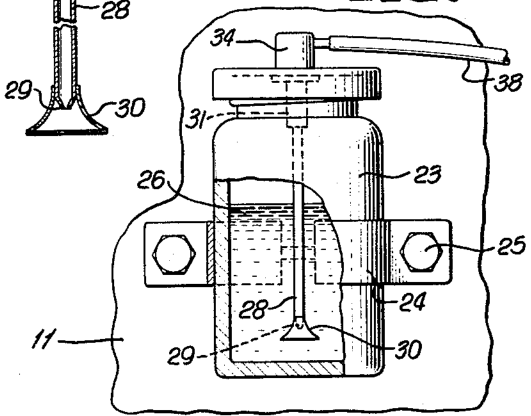
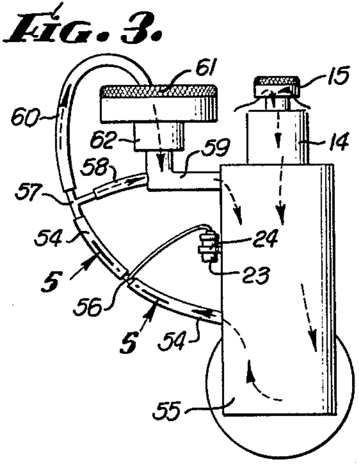
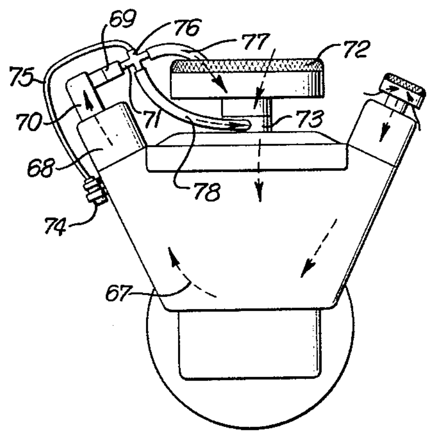
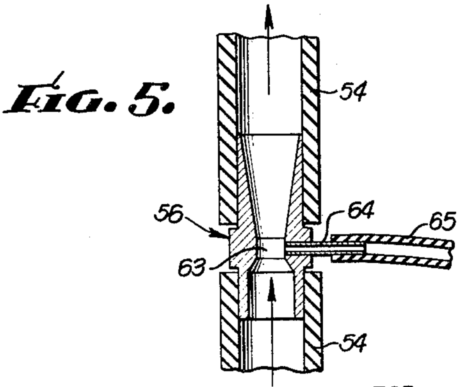
INVENTOR.
ALBERT G. H. VANDERPOEL
BY White & Haefliger
ATTORNEYS.

United States Patent Office 3,177,858
Patented Apr. 13, 1965

3,177,858
ANTI-FOULING OF BLOWBY RETURN SYSTEMS
Albert G. H. Vanderpoel, 14509 Van Ness Ave., Gardena, Calif.
Filed Feb. 28, 1964, Ser. No. 348,241
13 Claims. (Cl. 123—119)

This invention relates generally to the control of internal combustion crankcase emissions, and more particularly concerns improvements having to do with solving certain problems which arise when such emissions are returned to the engine air intake system.

In recent years the search for a solution to the problem of atmospheric pollution has led to the installation and use on automobiles of devices which return crankcase emissions to the engine air intake system. Such emissions are generally synonymous with so-called blowby gases resulting from leakage past the piston rings and into the crankcase of unburned or partially burned fuel and air mixtures, particularly when the piston rings are worn, but they may also include particles of hot oil splashing in the crankcase and also crankcase ventilation air. Generally speaking, the returned stream is contaminated with hydrocarbons and particles of carbon which over a period of time tend to foul the return stream path, particularly small orifices through which the stream is drawn to the engine via the air intake system. Problems arising from this type system include contamination of the air intake system including the carburetor jets, plugging of the emissions return path to the engine, the necessity for frequent cleaning of the return ducting to eliminate crankcase back pressure, and engine roughness.

The present invention contemplates a solution to these and other problems associated with crankcase emissions return to the engine, through the retardation or elimination of the contaminating effect of the return flow, and particularly in a novel and unusual manner resulting in trouble free performance obtained at low cost. Basically, means is provided for supplying an additive fluid to mix with the return stream of crankcase emissions flowing to the air intake system, the additive characterized as resisting the tendency of contaminants in the return stream gas to foul said path. For example, the supply means typically includes a container for additive liquid, a delivery duct having an inlet in the container, and a venturi of adequate capacity to pass the blowby gas or emissions return stream, the venturi communicating with the delivery duct to draw additive fluid from the container to the venturi for mixing in atomized form with the blowby gas as it flows to the air intake system. It is found that the desired reduction of contaminating effect can be accomplished by limiting the withdrawal of additive atomized liquid from the container to intervals when the flow rate of blowby gas return to the air intake system is less than maximum, and the invention contemplates the provision of means to restrict such withdrawal when the blowby flow rate approaches maximum levels.

It is another object of the invention to combine the above mentioned additive atomized fluid supply means with other means for regulating the return stream flow of crankcase emissions by causing the flow to pass through an orifice restriction controlled by manifold vacuum or crankcase vacuum, in order to prevent contamination or plugging of the orifice restriction.

These and other objects and advantages of the invention, as well as the details of an illustrative embodiment, will be more fully understood from the following detailed description of the drawings, in which:

FIG. 1 is a front elevation schematic showing of an internal combustion engine with a spring loaded metering valve actuated by intake manifold vacuum in which the anti-contamination system of the invention has been installed;

FIG. 2 is an enlarged elevation taken in section on line 2—2 of FIG. 1;

FIG. 3 is a view like FIG. 1, but showing a modified installation on an engine with a split flow crankcase ventilating system;

FIG. 4 is an enlarged view, partly in section and taken on line 4—4 of FIG. 1, showing the container portion of the additive fluid supply system;

FIG. 5 is an enlarged elevation taken on line 5—5 of FIG. 3;

FIG. 6 is a view like FIG. 1, but showing another modified installation on an engine with a split flow crankcase ventilating system; and FIG. 7 is an enlarged sectional showing of that portion of the additive delivery ducting associated with the additive container.

Referring first to FIG. 1, the engine 10 includes a cylinder block 11, crankcase 12, air intake system 13, valve cover 14, and breather cap 15. The air-fuel intake system itself includes a filter 16, carburetor 17 and intake manifold 18. Crankcase emission gases including engine blowby are drawn upwardly through piping 19 as indicated by arrows 20, to a hose 21, and are returned to the intake manifold at connection 22.

Extending the description to FIGS 2, 4 and 7, means is provided for supplying an additive fluid in atomized form to mix with the return stream of blowby gases in flowing to the air-fuel intake system, the additive being characterized as resisting the tendency of contaminants in the return stream gas to foul the return stream path. Typically, the supply means includes a container 23 sufficiently translucent or transparent that the level of additive liquid 26 therein can readily be ascertained. While the container can be suitably mounted near the engine, it is seen in FIGS. 1 and 4 as clamped to the engine block 11 by a strap 24 and fasteners 25. The additive liquid may comprise a solvent containing engine top cylinder oil such as that manufactured by Wynn Oil Company of Azusa, California.

The additive supply means also typically includes delivery ducting having an inlet in the container. The ducting shown includes a vertical tube 28 within the container 23 and having a restricted lower terminal inlet 29 receiving additive through a screen 30 for filtering out particles which might tend to plug the ducting. The top of the tube 28 is received in a valve chamber 31 containing a ball type check valve 32 shown in FIG. 7 as spaced below the seat 33. Top closure 35 for container 23 receives a stem of cap 34 threaded into the chamber 31 to hold the chamber tightly against a washer 131 under the closure. Chamber 31 contains air bleed openings 37 above the liquid level in the container 23, the openings serving to reduce the vacuum in duct 28 to limit the pull on inlet 29, as well as to admit air for atomizing the fluid flowing in duct 28. Thus for example, the system may operate at vacuum levels as low as 6 inches of water at inlet 29.

A duct 38 leads from a cap discharge port 39 to a side port 40 in the blowby return line leading from the engine crankcase to the intake manifold 18. As seen in FIG. 2, port 40 is typically at the throat 41 of a tubular venturi body 42 connected in series with hose 21. Body 42 may have thread connection at 43 to a tubular fitting 44 connected to piping 19.

In operation, as the flow of blowby gases increases through the venturi body 42, greater suction will be created at throat region 41, and communicated via duct 38 and chamber 31 to tube 28. Additive liquid in atomized form will then be drawn from the container to the venturi for mixing with crankcase emission gases flowing to the intake manifold of the engine. The calibrated air bleeds at 37 allow air to enter the flow of additive to emulsify it for facilitating flow thereof to the venturi throat and to obtain the desired reduced vacuum pull on tube 28.

At predetermined vacuum conditions communicated to the chamber 31, the ball check 32 will be lifted to seat at 33 for sealing off the vacuum communication to the tube inlet 29 and limiting further flow of additive to the venturi until the vacuum drops. This action conserves the supply of additive, it being found that sufficient additive may be caused to flow at lesser vacuum levels, i.e. lesser blowby flow rates, to blend with the blowby gases for preventing undesired contamination. Accordingly, the supply of additive may be considered as flowable intermittently to blend with the blowby return.

FIG. 2 also shows a regulator valve means in series with hose or line 21 for regulating the return stream flow of engine crankcase emission gases, by causing the gases to flow through an orifice restriction. The illustrated valve means includes a tubular body 45 connected at 46 to the venturi body 42, and containing a spring urged valve plug 47. Plug 47 is movable from the flow blocking position, in which it is shown as seated at 48, to flow passing position indicated by the broken lines 49 and in response to suction communication thereto from the engine intake manifold. Such movement is resisted by the spring 50, which acts to keep the plug seated when the engine is not operating. Porting 51 and 52 in the plug 47 passes the blowby gases when the plug is unseated, and acts as an orifice restriction to meter or limit the blowby gas flow, in order not to materially disturb the engine carburetion. Since the venturi 42 is upstream of porting 51 and 52, any tendency for contaminants to foul the orifice restriction 51 and 52 is mitigated by the atomized additive solvent entering the return stream of blowby gases before they reach the orifice restriction.

FIG. 3 shows a slightly different form of crankcase emissions return stream flow to the engine air intake system. Duct 54 leading from the crankcase 55 contains the venturi body 56 and connects to a T-orifice assembly 57. One outlet from the tee leads via line 58 through an orifice to the engine intake manifold 59, while the other outlet from the tee leads via line 60 to the engine air intake filter 61 mounted on the carburetor 62. The tee 57 permits a large proportion of blowby gases returned directly to the filter 61 at heavy loads and to manifold 59 at idle and light loads. FIG. 5 shows the venturi body 56 to have an adequately large throat region 63 like that at 41 in FIG. 2, a side inlet port 64, and an additive supply duct 65 like 38 in FIG. 2.

FIG. 6 illustrates an installation on a V-8 engine 66, wherein crankcase emission gases or blowby are communicated as by the flow indicating arrows 67 to the valve cover 68. A venturi body 69, like that at 56 in FIG. 5, may be connected at 70 to the cover 68 and may discharge to the tee 71. As before, one outlet from the tee communicates via line 77 with the air cleaner 72, and another outlet via line 78 with the intake manifold 73. An additive container is seen at 74, with ducting 75 leading from the container to the tee side inlet 76, there being a venturi in the tee body similar to the venturi seen in FIG. 5.

I claim:

1. In combination with a line connectible with an internal combustion engine to pass a return stream of engine crankcase emission gases to the engine air-fuel intake system, the improvement which comprises means responsive to the flow of said return stream for supplying and for limiting the supply of an additive fluid to mix with said return stream in flowing to said air-fuel intake system, said additive characterized as resisting the tendency of contaminants in said return stream gas to foul the return stream path.

2. In combination with a line connectible with an internal combustion engine to pass a return stream of engine blowby gas to the engine air-fuel intake system, means for regulating the return stream flow by causing said flow to pass through an orifice restriction, and means responsive to the flow of said return stream for supplying and for limiting the supply of an additive atomized fluid to mix with said return stream in flowing downstream through said orifice restriction and then to said air-fuel intake system, said additive characterized as resisting the tendency of contaminants in said blowby gas to foul the path of said side stream thereof.

3. In combination with a line connectible with an internal combustion engine to pass a return stream of engine blowby gas to the engine air-fuel intake system, regulator valve means for regulating the return stream flow by causing said flow to pass through an orifice restriction, the valve means including a body and a spring urged valve plug movable therein from flow blocking position to flow passing position in response to suction communication thereto from said air-fuel intake system, and means responsive to the flow of said return stream for supplying an additive atomized fluid to mix with said return stream in flowing downstream through said orifice restriction and then to said air-fuel intake system, said last named means including a port communicating with said line upstream of said valve means to deliver additive atomized fluid thereto in response to said return stream flow past said port, said additive characterized as resisting the tendency of contaminants in said blowby gas to foul the path of said side stream thereof.

4. The combination of claim 3 in which said port is located in said valve body.

5. For combination with a line operable in an internal combustion engine to pass a return stream of engine blowby gas to the engine air-fuel intake system, and with means for regulating the return stream flow by causing said flow to pass through an orifice restriction, the improvement which comprises means responsive to the flow of said return stream for supplying and for limiting the supply of an additive atomized fluid to mix with said return stream in flowing downstream through said orifice restriction and then to said air-fuel intake system, said additive characterized as resisting the tendency of contaminants in said blowby gas to foul the path of said return stream thereof, said supply means including a port communicating with said line upstream of said orifice restriction to deliver additive atomized fluid thereto in response to said return stream flow past said port.

6. For combination with a line operable in an internal combustion engine to pass a return stream of engine blowby gas to the engine air-fuel intake system, the improvement which comprises means for supplying an additive atomized fluid to mix with said return stream, said additive characterized as resisting the tendency of contaminants in said blowby gas to foul the path of return stream flow, said means including a container for said additive fluid, an additive delivery duct having an inlet in said container and a venturi to pass said blowby gas return stream and communicating with said duct to draw additive atomized fluid from the container to the venturi, and including means for limiting the withdrawal of additive from the container during increased flow of blowby gas in said return stream through the venturi.

7. In combination with a line connectible with an internal combustion engine to pass a return stream of engine crankcase emission gases to the engine air-fuel intake system, the improvement which comprises means for supplying an additive fluid to mix with said return stream in flowing to said air-fuel intake system, said additive characterized as resisting the tendency of contaminants in said return stream gas to foul the return stream path, said means including a container for said additive fluid, additive delivery ducting having an inlet in said container and a venturi to pass said blowby gas return stream and communicating with said duct to draw additive fluid from the container to the venturi, and including means for limiting the withdrawal of additive from the container during increased flow of blowby gas in said return stream through the venturi.

8. The combination of claim 7 in which said venturi has two outlets, one of which communicates with said line leading to the engine air-fuel intake manifold, and the other of which communicates with the engine air intake upstream of the engine carburetor.

9. In combination with a line connectible with an internal combustion engine to pass a return stream of engine blowby gas to the engine air-fuel intake system, regulator valve means for regulating the return stream flow by causing said flow to pass through an orifice restriction, the valve means including a body and a spring urged valve plug movable therein from flow blocking position to flow passing position in response to suction communication thereto from said air-fuel intake system, and means for supplying an additive atomized fluid to mix with said return stream in flowing downstream through said orifice restriction and then to said air-fuel intake system, said last named means including a port communicating with said line upstream of said valve means to deliver additive atomized fluid thereto in response to said return stream flow past said port, said additive characterized as resisting the tendency of contaminants in said blowby gas to foul the path of said side stream thereof, said last named means including a venturi connected in series in said line, with said port located at the venturi throat, and a container for said additive connected to feed additive to said port in response to said return stream flow past said port.

10. The combination of claim 9 in which said last named means includes an additive delivery duct having an inlet in the lower interior of said container and connected to deliver additive to said port, said duct having air bleed openings to allow mixing of air with additive being delivered through said duct, and to reduce the vacuum at said duct inlet.

11. For combination with a line operable in an internal combustion engine to pass a return stream of engine blowby gas to the engine air-fuel intake system, and with means for regulating the return stream flow by causing said flow to pass through an orifice restriction, the improvement which comprises means connectible to said line for supplying an additive atomized fluid to mix with said return stream in flowing downstream through said orifice restriction and then to said air-fuel intake system, said additive characterized as resisting the tendency of contaminants in said blowby gas to foul the path of said return stream thereof, said supply means including a port communicating with said line upstream of said orifice restriction to deliver additive atomized fluid thereto in response to said return stream flow past said port, said supply means including a venturi connectible in series in said line with said port located at the venturi throat, and a container for said additive connected to feed additive to said port in response to said return stream flow past said port.

12. The combination of claim 11 in which said supply means includes an additive delivery duct having an inlet in the lower interior of said container and connected to deliver additive to said port, said duct having air bleed openings to allow mixing of air with additive being delivered through said duct.

13. For combination with a line operable in an internal combustion engine to pass a return stream of engine blowby gas to the engine air-fuel intake system, and with means for regulating the return stream flow by causing said flow to pass through an orifice restriction, the improvement which comprises means connectible to said line for supplying an additive atomized fluid to mix with said return stream in flowing downstream through said orifice restriction and then to said air-fuel intake system, said additive characterized as resisting the tendency of contaminants in said blowby gas to foul the path of said return stream thereof, said supply means including a port communicating with said line upstream of said orifice restriction to deliver additive atomized fluid thereto in response to said return stream flow past said port, said supply means including an additive flow responsive valve in series with said port to limit delivery of additive to said blowby gas return stream.

References Cited by the Examiner

UNITED STATES PATENTS 3,105,471 10/63 MacPherson ------------ 123—119

FOREIGN PATENTS 664,766 4/29 France.
761,210 3/34 France.

KARL J. ALBRECHT, *Primary Examiner.*